Dec. 9, 1969   J. G. BAKER ET AL   3,482,522
PITLESS BOOSTER PUMP UNIT
Filed Jan. 15, 1968
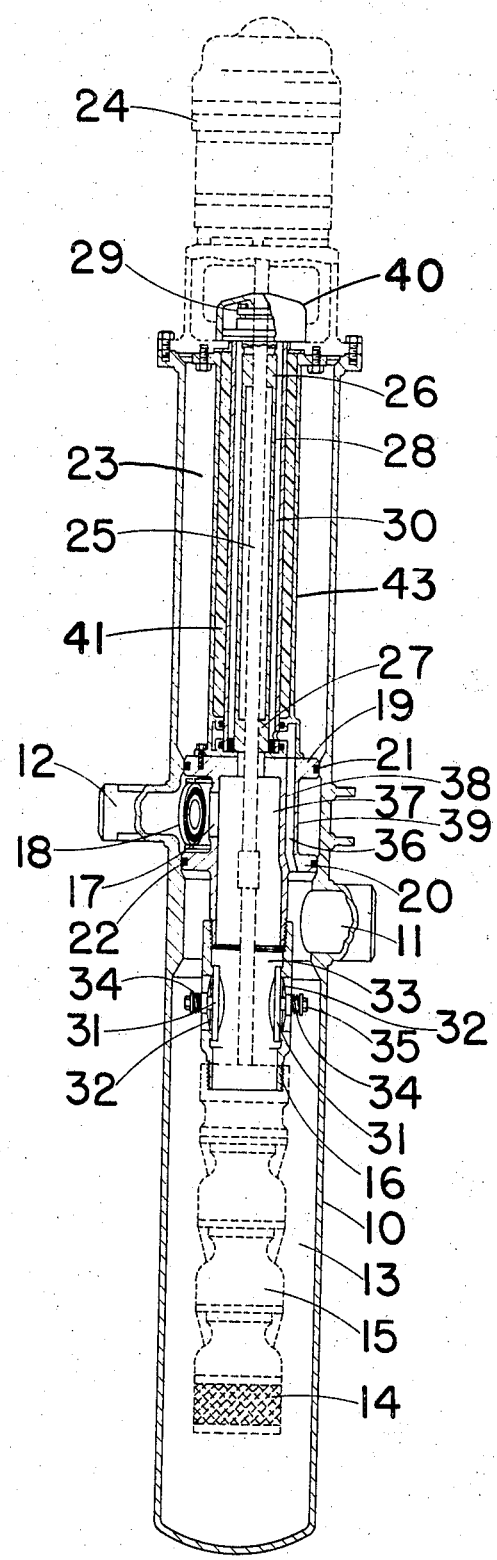
NEIL C. LIEN
JOHN GORDON BAKER
INVENTOR.
BY
GEORGE E. SZEKELY
ATTORNEY

3,482,522
PITLESS BOOSTER PUMP UNIT
John Gordon Baker and Neil C. Lien, Evansville, Wis., assignors to Baker Manufacturing Company, Inc., Evansville, Wis.
Filed Jan. 15, 1968, Ser. No. 703,208
Int. Cl. F04d *13/02, 9/04*
U.S. Cl. 103—87                                5 Claims

ABSTRACT OF THE DISCLOSURE

A prefabricated booster pump unit for increasing the head in a buried pipeline. The unit has an inlet chamber at the bottom of a case, which has an inlet and a discharge for connection of the unit into the pipeline. A tubular column member extends from a discharge spool communicating with the discharge and a pump suspended on the column. One or more normally-closed check valves in the column wall between the spool and the pump open under head maintained in the inlet chamber by a primary pressure source, when the booster pump is shut off for periods during which head of the primary source is sufficient for delivery conditions. The open valves admit water from the inlet chamber directly into the column and thence to discharge, bypassing the pump. The spool, discharge column and pump constitute a self-contained assembly which can be removed and replaced as a unit by means of a liftout column extending from the spool to the top of the case. At the top, the case is provided with a seal cap acting as a support for the spool/pump assembly and a base for a drive motor. With a drive motor above the cap, bearings for a drive shaft are provided in housings carried in the liftout column, the bearings being lubricated by water diverted from the discharge flowing through the housings and back to the inlet chamber via a passage through the spool.

BACKGROUND OF THE INVENTION

Field of the invention

This invention relates to improvements in booster pump units and more particularly to such units for buried pipe lines in which the flow in the pipe line may bypass the pump.

The prior art

A booster pump is often used under conditions of variable demand, such that the primary pump at certain times is capable of providing the demand without booster assistance. In such case if the booster is not pumping there is substantial pressure loss as the fluid flows through the idle pump.

To avoid this pressure loss a pipeline bypassing the pump is used with a check valve to prevent back flow when the booster pump is running. Ordinarily when such a booster pump and the related piping is underground a pit or vault is used to make the pump, pump pipe connections, shaft seal and valves accessible for maintenance or replacement.

SUMMARY OF THE INVENTION

The general object of this invention is to provide for a buried pipeline a booster pump unit, including a conduit to bypass the pump when the pump is not running, in which unit all moving parts are readily accessible for maintenance or replacement without the need of an underground pit or a vault.

A second object of the invention is to simplify the installation, maintenance and replacement of the pump and/or other components of a booster pump unit.

A third object is to place the drive shaft seal of a booster pump unit above ground for accessibility while substantially reducing the danger of freezing where water is the fluid pumped.

A fourth object is to provide lubrication and cooling for the drive shaft bearings of a booster pump unit using the fluid pumped.

The above objects are achieved by means of a cylindrical closed bottom case, having inlet and discharge ports connected to the underground pipeline involved, and a column assembly extending into and readily removable from the case. This assembly includes the booster pump, drive motor and all other components of the invented booster pump unit except the case.

BRIEF DESCRIPTION OF THE DRAWING

The drawing is a vertical section through a unit constructed according to this invention with the pump, drive motor and drive shaft shown with dotted lines.

PREFERRED EMBODIMENT

Referring to the drawing, reference numeral 10 indicates a case having an inlet port 11 and discharge port 12 at somewhat higher elevation. Inlet 11 communicates with inlet chamber 13, in turn communicating with pump inlet 14. In normal operation water flows through the turbine pump 15 to column 16, thence through column port 17 into discharge chamber 18, communicating with discharge port 12.

Spool flanges 19 and 20 carry seals 21 and 22, cooperating with case 10 to define discharge chamber 18, sealing same from the upper chamber 23 and inlet chamber 13.

Motor 24 drives pump 15 by means of line shaft 25, which runs in upper and lower bearings 26 and 27 respectively, housing a shaft housing 28. A stuffing-box seal 29 is provided at the upper end of shaft 25, to prevent leakage from housing 28.

When the pump 15 is operating the pressure in chamber 33 is higher than in the inlet chamber 13 causing the fluid to flow upward through the bearings 27 and 26, outward into the passage 30, then downward through the passages 30 and 36 into the inlet chamber 13. This flow lubricates the bearings 27 and 26, prevents excessive heat in these bearings and in the stuffing-box seal 29, yet also conducts heat to the stuffing-box, the bearing 26 and upper portion of the shaft 25. This heat is conserved by the insulating cap 40 and the insulating cylinder 41 to prevent freezing if the fluid pumped is water. A small heating coil within the cap 40 may of course be used in severe climates.

Liftout column 43 is attached to spool flange 19, whereby the spool, comprising flanges 19, 20, and core 38 carrying valve 18, together with conduit 31, carrying valves 32, and pump 15 can be removed and replaced as a unit, by lifting and lowering axially of case 10, without disturbing connections 11 and 12, thus simplifying servicing and repair of the several appurtenances, whenever required.

If the primary pump (not shown) is capable of maintaining sufficient head to satisfy the demand supplied through discharge pipe 12, the booster pump 15 will be permitted to idle, in which case the pressure drop through pump 15 opens the bypass valves 31 allowing the fluid entering the port 11 to bypass the pump 15. The valve springs 34 reduce the shock when the valves 31 close and supplement the pressure drop of the flow which increases the reverse flow through the bearings 26 and 27 and thus continues lubrication and heat transfer functions similar to those described above.

Seal 29 is preferably adjusted so that it is substantially water-tight, but not air-tight. This adjustment will provide relief of possible air-lock, which may otherwise obstruct flow of water to the upper bearing 26, yet prevent excessive water leakage.

If a shorter unit is desired, column member 16 may be reduced in length in which case valves 41 may be installed in spool flange 20.

The foregoing description of a preferred embodiment will enable those skilled in the art to devise modifications or adaptations of this invention, within the spirit and scope of the appended claims, which define the invention.

We claim:
1. A pitless booster pump unit comprising: a case having an inlet, a discharge immediate the ends of said case, and an inlet chamber below said discharge communicating with said inlet; a discharge spool in said case defining with portions of said case a discharge chamber communicating with said discharge; a pump in said inlet chamber adapted to pump water from said inlet chamber to said discharge chamber; and isolation means including normally-closed valve means controlling at least one port in said isolation means, said valve means being adapted to open in response to water pressure in said inlet chamber exceeding water pressure beyond the discharge side of said pump, thereby establishing fluid communication between said inlet chamber and said discharge through said at least one port, when said pump is idle, bypassing said pump, said isolation means being adapted to prevent fluid communication between said inlet and discharge chambers along any portion of a path between said pump and said spool except directly through said pump, upon said valve means being in closed position.

2. A pitless booster pump unit according to claim 1, wherein said valve means includes a spring check valve arranged to open upon predetermined differential between inlet and discharge pressures prevailing in said unit.

3. A pitless booster pump unit according to claim 2, wherein said isolation means includes a tubular column connecting said pump to said spool, said port being in said column.

4. A pitless booster pump unit according to claim 1, further including a pump motor remote from said pump and above said spool; a line shaft connecting said motor with said pump; a line shaft bearing housing between said motor and said spool; and a passage affording fluid communication between said discharge chamber and said inlet chamber through said housing, whereby to divert water from said discharge chamber for lubricating said bearings.

5. A pitless booster pump unit according to claim 1, said inlet and said discharge being adapted for connection of said unit in a pipeline, said spool, said isolation means and said pump constituting a unitary assembly readily movable axially of said case relative to said inlet and said discharge, said unit including a liftout column affixed to said spool and extending axially of said case to the upper end thereof, whereby to facilitate removal and replacement of said assembly as a unit without disturbing said connection.

References Cited
UNITED STATES PATENTS 3,073,248    1/1963    Bartels.
3,228,343    1/1966    Anton et al.

ROBERT M. WALKER, Primary Examiner

U.S. Cl. X.R.

103—102, 113

UNITED STATES PATENT OFFICE
CERTIFICATE OF CORRECTION

Patent No. 3,482,522 December 9, 1969

John Gordon Baker et al.

It is certified that error appears in the above identified patent and that said Letters Patent are hereby corrected as shown below:

Column 3, line 14, "immediate" should read -- intermediate --.

Signed and sealed this 3rd day of November 1970.

(SEAL)
Attest:

Edward M. Fletcher, Jr.

Attesting Officer

WILLIAM E. SCHUYLER, JR.
Commissioner of Patents